3,746,634
DEUTERATED LUBRICATING OILS
Joseph G. Atkinson, Montreal, Quebec, and Michael O. Luke, Beloeil, Quebec, Canada, assignors to Charles E. Frosst & Co., Kirkland, Quebec, Canada
Continuation-in-part of abandoned application Ser. No. 724,429, Apr. 26, 1968. This application Aug. 24, 1970, Ser. No. 66,657
Claims priority, application Canada, Apr. 29, 1967, 989,262; Aug. 4, 1970, 89,902
Int. Cl. C10g 41/00
U.S. Cl. 208—18          6 Claims

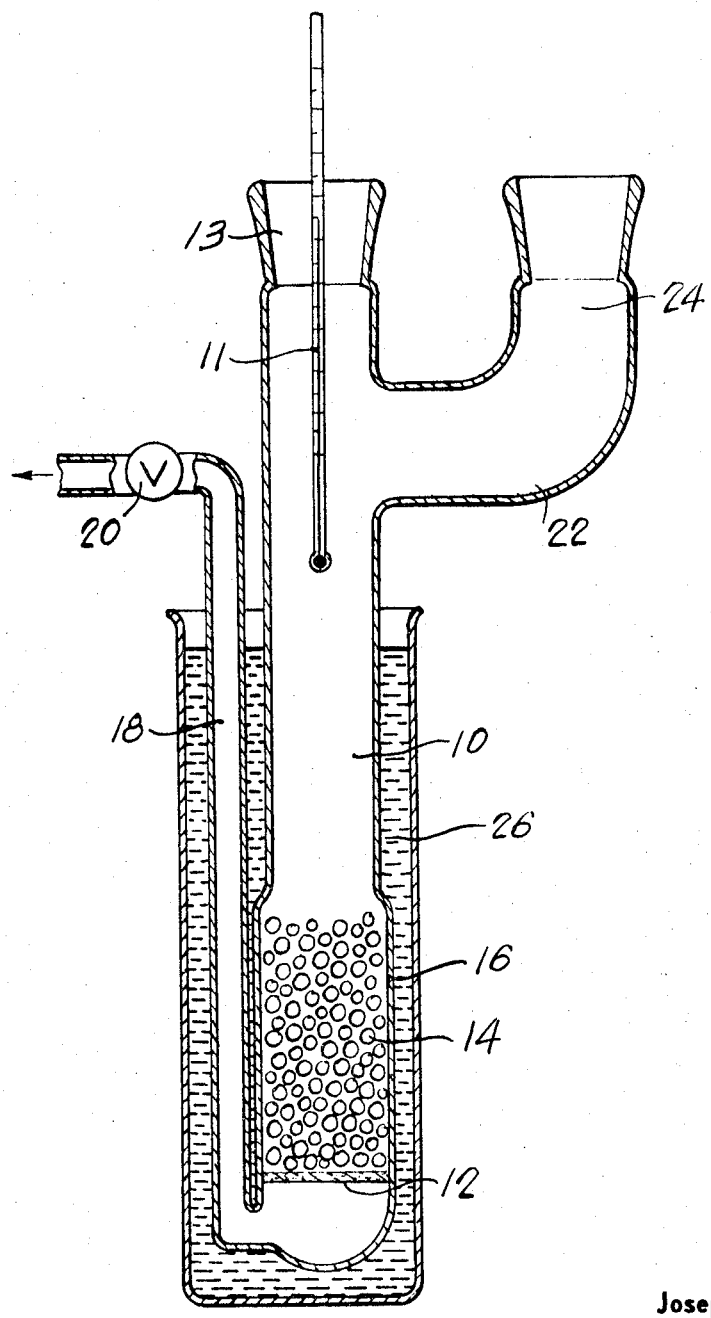

ABSTRACT OF THE DISCLOSURE

Deuterated saturated acyclic and cyclic hydrocarbons having at least 10 carbon atoms, a melting point no greater than 300° C. and an isotopic purity of at least 95 atom percent D are described. Deuteration of the substrate in its liquid state is effected with deuterium gas in the presence of a Group VII or VIII metal catalyst at a temperature between about 100–300° C.

---

This application is a continuation-in-part of U.S. patent application, Ser. No. 724,429, filed Apr. 26, 1968, now abandoned.

This invention is concerned with deuterated saturated hydrocarbons as well as with the process for preparing these compounds which comprises bringing together a saturated or unsaturated cyclic or acyclic hydrocarbon (having at least 10 carbon atoms and a melting point no greater than 300° C.) in its liquid state and deuterium gas in the presence of a catalyst from Group VII or Group VIII metals until such time as at least 95% of the hydrogen atoms have been replaced by deuterium atoms.

It is known to perdeuterate low molecular weight hydrocarbons having less than ten carbon atoms by using the mechanism of the gas-phase reaction between these low-boiling hydrocarbons and deuterium over metal films and supported metal catalysts. Further the known procedures show the feasibility of preparing pure, perdeuterated hydrocarbons by gas-phase exchange and, accordingly, it has been possible to prepare n-pentene, n-hexane, n-heptane, n-octane, 3-methylpentane, cyclobutane, cyclopentane, and methylcyclohexane with an isotopic purity of 98% D or better.

Subsequently, an attempt to cause a reaction between liquid hydrocarbons and deuterium gas proved to be unsuitable. More particularly, it was noted that liquid phase exchange of n-octane and 2,2,4-trimethylpentane with deuterium was inefficient and not suitable when compared with gas-phase exchange.

There is no evidence in the literature of exchange work with appreciably higher boiling hydrocarbons, although attempts were reported in J. Am. Chem. Soc. 84: 925 (1962) to deuterate hexene, $\Delta^{1,9}$-octalin and $\Delta^{9,10}$-octalin in liquid phase by bubbling deuterium gas through a mixture of the hydrocarbon and a suspended Pd or Pt catalyst at 24.5° C. This resulted in some of the saturated compounds having more than the number of D atoms necessary for reduction of the unsaturated compound but there was no evidence that high yields of perdeuterated species could be obtained under the conditions used or that exchange of saturated materials occurred. Furthermore, attempts to deuterate Decalin in such a system by treatment with deuterium gas over a platinum catalyst at 25° C. failed to cause an exchange. Similarly, British Pat. 798,030 (1958) to N. V. DeBataafsche Petroleum Maatschappy, described deuteration of anthracene in the presence of commercial alumina whereupon only 78% of the hydrogens originally present in the anthracene had been replaced by deuterium. Similar results were reported by Hubner et al., C.A. 68:70902$^y$ for their attempts to deuterate white oil.

It was also reported by Marr et al. in J. Org. Chem. 28:3085 (1963) that an investigation of liquid phase exchange of n-octene and 2,2,4-trimethylpentane and deuterium was found to be inefficient and not suitable in comparison with gas-phase exchange.

Gordon and Madison have reported in U.S. Atomic Energy Comm. Conf. 398–1 (C.A. 61:15615d (1964) a batch process for the deuteration of $C_2$ to $C_7$ hydrocarbons using either deuterium oxide or gaseous deuterium as the source of deuterium and a cobalt molybdenum sulfide on alumina catalyst. This procedure presents the disadvantage of being a batch process and since high temperatures are required, for example, higher than 350° C. cracking and isomerization occur along with exchange.

Finally, attempts have been made to use synthetic routes to deuterate solid paraffins and gasoline range hydrocarbons using metal catalyzed reactions of carbon monoxide and deuterium with the result that such processes give a mixture of products which must be isolated and purified if pure compounds are desired.

As can be seen from a study of the prior art, no procedure has yet been devised which is capable of deuterating saturated and unsaturated hydrocarbons having at least 10 carbon atoms and a melting point no greater than about 300° C. to provide an isotopic purity of at least 95 atom percent deuterium.

It is accordingly an object of the present invention to provide these novel deuterated saturated cyclic and acyclic hydrocarbons with an isotopic purity of 95 atom percent D or greater.

It is also a further object of the present invention to provide a process for preparing such deuterated saturated cyclic and acyclic hydrocarbons.

In accordane with the present invention there is now provided novel deuterated saturated cyclic and acyclic hydrocarbons from said substrate having at least 10 atoms and a melting point no greater than 300° C., said deuterated compounds being characterized by having at least 95% of the hydrogen atoms replaced by deuterium atoms. Any hydrocarbon of this type whether straight or branched chain acyclic or cyclic and either saturated or unsaturated can be deuterated to this isotopic purity by the process of this invention. Should the selected hydrocarbon starting material be unsaturated, i.e. an aromatic or olefinic compound, it will be deuterogenated under the reaction conditions of this invention to form the novel saturated deuterated hydrocarbons of this invention. Among the significantly important products of this invention are the at least 95% deuterated hydrocarbon type lubricating oils, whether synthetic or natural, light, medium or heavy grades, n-decane, n-hexadecane, Decalin and 1,2-dicyclohexylethane and the like. Other deuterated hydrocarbons having an isotopic content of at least 95 atom percent D are provided in the examples to illustrate the process and products of this invention.

It will be appreciated by those knowledgeable in this discipline that material of less than 100% isotopic purity contains a mixture of isotopic species. Any highly deuterated compound contains, by definition, little hydrogen, and therefore consists of a large proportion of the species containing no hydrogen and quite small amounts of less well deuterated species. In contrast, a compound of low isotopic purity contains a relatively large proportion of material containing only hydrogen and varying amounts of species containing one, two, three etc. deuterium atoms per molecule.

As another feature of this invention there is provided a novel process for preparing the above deuterated saturated cyclic and acyclic hydrocarbons with an isotopic purity of at least 95 atom percent D. The process comprises bringing together a saturated or unsaturated cyclic or acyclic hydrocarbon having at least 10 carbon atoms and a melting point no greater than 300° C. in its liquid state and deuterium gas in the presence of a Group VII or VIII metal catalyst at temperatures below the boiling point of the hydrocarbon whereby a hydrogen-deuterium exchange between deuterium gas and the liquid hydrocarbon takes place. The process can be carried out in a batch or cocurrent exchange system or in a countercurrent system. The reactors employed for these systems are essentially the same except in the batch system the substrate is layered above the catalyst bed and the deuterium gas is fed in at the bottom of the reactor and allowed to flow through the catalyst bed and substrate while in the cocurrent system the $D_2$ gas and substrate are each fed in at the top of the reactor and allowed to flow down through the catalyst bed and in the countercurrent system the $D_2$ gas is added at the bottom of the reactor and the substrate at the top so that they pass through the catalyst bed in opposite directions. Theoretically more efficient use of the $D_2$ gas is possible with the countercurrent reactor resulting in a shorter reaction time and less $D_2$ gas requirement per unit amount of deuterated product obtained.

As starting material there may be used branched or straight chain, acyclic or cyclic hydrocarbon, either saturated or unsaturated and optionally mixtures thereof. It is well known for example, that lubricating oils can be discrete chemical compounds such as squalane, pristane, n-pentadecane, 2,6,11,15-tetramethylhexadecane, 2,2,4,4,6,8,8-heptamethylnonane and other hydrocarbon petroleum products having a melting point no greater than 300° C., all of said substances being well known in the trade. Usually, however, the lubricating oils are supplied as mixtures of different molecular weight species. In either case, the selected lubricating oil can be deuterated by the process of this invention to provide lubricants with improved oxidation resistance. It is to be noted that in all cases the deuterated product ultimately obtained is the fully saturated equivalent of the starting material.

The hydrogen-deuterium exchange between deuterium gas and the hydrocarbon liquid is carried out below the boiling point of each hydrocarbon usually within a temperature range of 100° C. to 300° C. with a preferred temperature range of from 150° to 250° C. It was found that by operating at a temperature below the boiling point of the hydrocarbon, cracking of the hydrocarbon is negligible since 1% or less of the deuterated products have a significantly higher or lower boiling point than the desired deuterated hydrocarbon.

As catalyst there may be used any of the common catalysts from Group VII or VIII metals preferably supported on an inert carrier. Illsutrative examples are rhenium, palladium, platinum and rhodium on an activated carbon bed although other carriers as kieselguhr, silica gel, pumice or other well-known carriers can be employed. Palladium and rhenium have been found to be efficient general purpose catalysts. The amount of catalyst is not critical but generally at least 2% of the catalyst on a carrier, such as activated carbon, has been found to effectively catalyze the conversion of the starting material to the deuterated product.

Dispersion of the deuterium gas in the hydrocarbon liquid is carried out by regulating the flow of deuterium to preferably 40 to 150 ml./min. (although a higher or lower rate of flow could be used) through a porous glass disk into the stationary catalyst layer which has a mesh size of about 5–40 mesh and preferably 5–30 mesh. The flow of deuterium gas through the liquid hydrocarbon is carried out continuously for a period of time varying between 30 to about 5,000 hours, the length of time being dependent upon the number of carbon atoms in the hydrocarbon, its degree of unsaturation, the quantity of substrate to be deuterated and the attainment of at least a 95% deuteration of the hydrocarbon. Although the elapsed time required to prepare certain deuterated compounds can be several weeks, the process requires very little attention once in operation, except for the periodic withdrawal of samples for analysis.

Once the reaction is terminated the deuterated hydrocarbon can be isolated by conventional methods which will vary depending upon whether the deuterated hydrocarbon is liquid or solid at room temperature. When the deuterated hydrocarbon is liquid at room temperature, it can be extracted with a low boiling hydrocarbon, for example, pentane or hexane and the solvent then removed by distillation and the deuterated hydrocarbon purified by distillation under vacuum. When the deuterated hydrocarbon is solid at room temperature it also can be extracted with a low boiling hydrocarbon, e.g. pentane, the solvent removed by distillation and the solid residue recrystallized from a low boiling solvent such as pentane. Certain of the higher molecular weight hydrocarbons, such as the deuterated lubricating oils can be isolated by removing the solvent under high vacuum and the residual lubricant need not be distilled, or, more simply, they can be isolated by permitting them to drain from the catalyst.

In order to more fully understand the process of the present invention reference is made to the accompanying drawing wherein the figure shows a diagram of an apparatus that can be used with proper modifications for batch, cocurrent or countercurrent deuteration. A reaction chamber 10 provided with a bottom made up of a porous glass disk 12, is charged with the catalyst on charcoal or other support 14. The top is provided with thermometer 11 fitted in the opening 13 which can also be used as a sample port by removing the thermometer. The lower portion of the reaction vessel 10 has a section 16 of a greater diameter than that of the reaction vessel 10 so as to retain the catalyst 14 substantially stationary. When the apparatus is to be employed as a batch or countercurrent system a deuterium gas conduit 18 is provided with a flow control device 20 to regulate the flow of deuterium gas through the porous glass surface 12. The upper portion of the reaction vessel 10 is provided with a conduit 22 connecting to a reflux condenser not shown but positioned at conduit 24. Substantially all of reaction vessel 10 and section 16 containing the catalyst 14 is placed in a bath 26 which can be regulated to the temperature required to liquify the hydrocarbon being treated and to bring it to the optimum reaction temperature. Alternatively, the bath 26 could be replaced by electrical elements.

An advantage of the process of the present invention resides in the fact that unsaturated hydrocarbons, such as 1,5,9-cyclododecatriene and trans-stilbene will ultimately lead to their fully saturated, deuterated counterparts if required. Presumably, the unsaturated starting hydrocarbon is first reduced with deuterium to the saturated, partially deuterated compound which then goes on to be exchanged as shown in the following Equations 1 and 2:

(1) 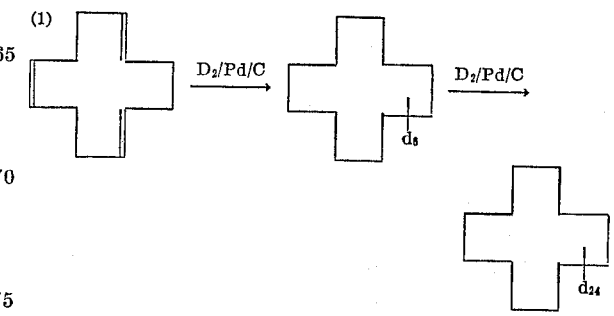

(2) 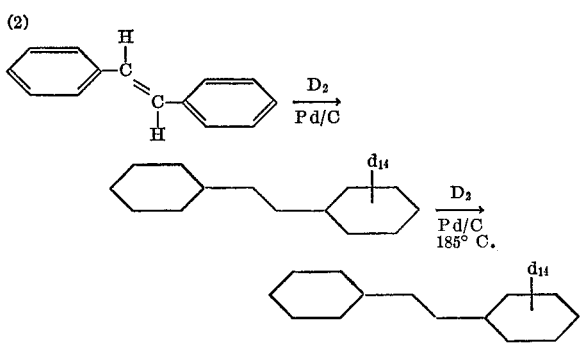

A further advantage of the process of the present invention is that no cracking or isomerization of the substrate is observed under the conditions of exchange. The recovered deuterated products, where discrete chemical entities are employed as starting compounds, are homogenous by vapor phase chromatography and possess sharp melting points and correct boiling points. Further, it was found that the mass spectra corroborate the structures of these fully deuterated discrete chemical compounds and confirm their isotopic purity. However, epimerization of asymmetric carbon atoms does occur as shown by the results with Decalin in Equation 3:

(3) 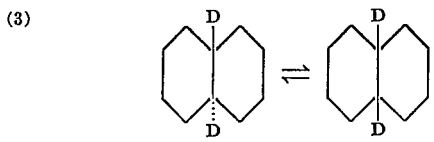

Starting with either pure cis- or trans-Decalin, an equilibrium mixture of the two isomers is obtained which contains about 92% trans-Decalin-$d_{18}$ and 8% cis-Decalin-$d_{18}$. These equilibrium values, obtained at 448° K. agree well with those of Allinger et al. in J. Am. Chem. Soc. 81: 4080 (1959) who measured the cis-trans equilibrium catalyzed by 5% Pd on carbon in an atmosphere of hydrogen and at 531° K. found the equilibrium composition to be 8.96% cis-Decalin and 91.04% trans-Decalin.

The novel deuterated hydrocarbons of the present invention are highly stable and have been found to be particularly useful in a variety of fields, such as superior lubricants either as such or compounded with a thickener to form a grease having enhanced oxidation resistance, longer service life and being suitable for use under vigorous operating temperatures; in radiolysis experiments, petroleum chemistry, microbiological oxidation studies, nuclear magnetic resonance, mass spectral work, infrared spectrometric work and as high temperature solvents. The compounds of this invention have found use in the study of deuterium nuclear magnetic resonance. They have also found use in the study of mass spectral cracking patterns and the influence of the presence of deuterium on these patterns. By comparative techniques, this allows a determination of the isotope effects observable in mass spectrometry. The deuterated lubricating oils have been found superior to the undeuterated specie as specialty and instrument lubricants because of their greater oxidation resistance which provides longer service life and/or higher temperature operation. It has also been found that when compounded with thickeners such as lithium 12-hydroxystearate, diatomaceous earth, clay, silica or other known thickeners to form a grease, that said grease also has a longer service life because of the oxidation resistant property of the deuterated lubricating oil employed in its preparation.

The process for preparing the deuterated hydrocarbons of the present invention will be more fully understood by referring to the following examples:

EXAMPLE 1 n-Hexadecane-$d_{34}$

With the deuterium inlet fully closed, 3.5 g. of 2% Pd on activated carbon 10–30 mesh then 2.5 g. 5–10 mesh catalyst plus a layer of glass beads were introduced into the reactor via the thermometer port. 32 g. n-hexadecane was added, the thermometer assembly inserted into the reactor, and a water cooled condenser attached to the condenser arm and fitted with an exit tube for exhaust deuterium gas. Deuterium gas was then bubbled through the cell via the control at a rate of 40 ml./min. The cell assembly was lowered into a thermostated oil bath and kept at 190° C.

Periodically samples were taken for analysis by raising the cell out of the bath, shutting off the deuterium flow, and extracting (with syringe) a sample via the thermometer port. The system was then started up again as described above.

After 316 hours of operation it was determined by mass spectral analysis that the n-hexadecane contained 99.4 atom percent D. The contents of the cell were extracted with pentane and poured into a 100 ml. round bottom flask. The pentane was removed by distillation at atmospheric pressure and the deuterated n-hexadecane was vacuum distilled. Yield: 20 g. (54%) n-hexadecane-$d_{34}$; B.P. 102–117° C. at 2–5 mm., M.P. 14–15° C.

EXAMPLE 2 n-Tetracosane-$d_{50}$ n-Tetracosane-$d_{50}$ was prepared by the process of Example 1 except that 20 g. of the starting n-tetracosane was melted before deuterium gas was passed through the cell. After 596 hours, the material was 98.6 atom percent deuterium by nuclear magnetic resonance. It was extracted from the cell at room temperature with n-pentane (spectroscopic grade), pumped dry, then recrystallized from n-pentane. Yield: 11 g. (48%), M.P. 45–46° C.

EXAMPLE 3

Cyclododecane-$d_{24}$ 20 g. of 1,5,9-cyclododecatriene was treated in an identical manner as the n-hexadecane of Example 1, except that the process was run at approximately 100° C. After 48 hours the material was found to be fully saturated since it crystallized readily. The compound was then treated in an identical manner to n-tetracosane. After 1210 hours it was 99.51 atom percent D by mass spectral analysis and was extracted with and recrystallized from n-pentane.

In another experiment, cyclododecane (20 g.) was used as the starting material and 13.4 g. (59%) cyclododecane-$d_{24}$ (99 atom percent D. IR) was obtained after 452 hours of exchange, M.P. 60–62° C.

EXAMPLE 4

Decalin-$d_{18}$ 16 g. of cis-Decalin was run in an identical manner as in Example 1 but at 165° C. The resulting 13.6 g. (75%) of Decalin-$d_{18}$ obtained after 496 hours of exchange was 99 atom percent D by nuclear magnetic resonance and 92% trans and 8% cis. Similarly, starting with trans-Decalin, Decalin-$d_{18}$ (99 atom percent D) was obtained after about 500 hours, as a mixture of cis-Decalin-$d_{18}$ (8%) and trans-Decalin-$d_{18}$ (92%).

EXAMPLE 5

1,2-dicyclohexylethane-$d_{26}$ 12 g. of trans-stilbene was treated in the same way as n-hexadecane and 5 g. (37%) of 1,2-dicyclohexylethane-$d_{26}$ (98.1 atom percent D) by mass spectral analysis was obtained after 4,720 hours at 185° C.

By following the procedure substantially as described in Example 1 or Example 2, other deuterated products can be obtained. The following Table 1 illustrates the starting materials which may be employed, the deuterated products thus obtained, the catalyst used, the reaction exchange period in hours and the temperature of the reaction:

Pd/C, 6–8 mesh, heated to 250° C. The system was set up so that liquid flowing from the bottom of the reactor was automatically recycled back to the top of the reactor with a laboratory pump. After 9 days (216 hrs.) of exchange, 56 ml. (70% yield) of deuterated synthetic petroleum, light grade, of 99 atom percent D overall was obtained.

TABLE 1.—PERDEUTERATED HYDROCARBONS PREPARED BY EXCHANGE WITH DEUTERIUM GAS

| Example No. | Starting material | Product [d] and (atom percent D) | Catalyst [c] | Exchange time (hr.) | Temp., °C. |
|---|---|---|---|---|---|
| 6 | n-Decane | n-Decane-$d_{22}$ [a] (96) | Pd on C | 282 | 170 |
| 7 | do | n-Dodecane-$d_{26}$ [a] (98.6) | do | 430 | 195 |
| 8 | do | n-Dodecane-$d_{26}$ [a] (99) | Rh on C | 420 | 195 |
| 9 | 2,2,4,4,6,8,8-heptamethylnonane | 2,2,4,4,6,8,8-heptamethylnonane-$d_{34}$ [a] (95) | Pd on C | 700 | 195 |
| 10 | 1,5,9-cyclododecatriene | Cyclododecane-$d_{24}$ [b] (99.5) | do | 1,210 | 195 |
| 11 | n-Octacosane | n-Octacosane-$d_{58}$ [b] (97.9) | do | 1,500 | 195 |
| 12 | Squalane (2,6,10,15,19,23-hexa-methyltetracosane) | Squalane-$d_{62}$ [a] (99.5) | do | 1,465 | 195 |
| 13 | n-Pentadecane | n-Pentadecane-$d_{32}$ [a] (99) | do | 100 | 200 |
| 14 | 2,6,11,15-tetramethylhexadecane | 2,6,11,15-tetramethylhexadecane-$d_{42}$ [a] (99.4) | do | 200 | 200 |
| 15 | 2,2,4,4,6,8,8-heptamethylnonane | 2,2,4,4,6,8,8-heptamethylnonane-$d_{34}$ [a] (99) | do | 400 | 200 |

[a] Carried out in the same way as described in Example 1 for the preparation of n-hexadecane.
[b] Carried out in the same way as described in Example 2 for the preparation of n-tetracosane.
[c] All catalysts are 2% by weight of metal on activated carbon and in the 5–40 mesh range unless otherwise noted.
[d] The structure and isotopic purity of the products were confirmed by mass spectral analyses.

EXAMPLE 16 n-Dodecane-$d_{26}$

Following the procedure of Example 1 except that 64 g. of the starting material n-dodecane is employed and 7 g. and 5 g. of platinum on activated carbon catalyst are employed at a reaction temperature of 195° C., it was then determined by mass spectral analysis after 304 hours of operation, that the n-dodecane contained 99.74 atom percent D. Yield 32 g. (43%), boiling point 94° C. at 14 mm.

EXAMPLE 17 n-Octadecane-$d_{38}$

Following the procedure of Example 2 except that 16 g. of n-octadecane is employed and 3 g. and 2 g. of palladium on activated carbon catalyst is employed and at a reaction temperature of 195° C., it was determined, after 1360 hours of operation, by mass spectral analysis that the n-octadecane contained 97.9 atom percent D. Yield 6 g. (33%), melting point 28-29° C.

EXAMPLE 18 n-Hexatriacontane-$d_{74}$

Following the procedure of Example 2 and employing 20 g. of n-hexatriacontane as starting material and after 500 hours of exchange reaction period at 195° C., it was determined by mass spectral analysis that the n-hexatriacontane contained 99.5 atom percent D. Yield 15 g. (65%).

EXAMPLE 19

Pristane-$d_{40}$

Employing 16 g. of pristane and following the procedure of Example 1 over a period of 500 hours, at 195° C. 8 g. (43%) of pristane-$d_{40}$ is produced with a boiling point of 128–135° C. at 3 mm. and containing 99.5 atom percent D.

EXAMPLE 20

Exchange of synthetic petroleum (a) 80 ml. of synthetic petroleum, light grade (Nye Catalog No. 860–1) at a rate of 7–9 drops per minute and deuterium gas at a rate of 150 ml./minute were added to the top of a catalyst tower containing 15 g. 6%

(b) The same catalyst was used for a second exchange of 150 ml. (126 g.) of synthetic petroleum (Nye Catalog No. 860–1) which gave 140 ml. (93% yield) of synthetic petroleum (99 atom percent D) after 510 hours of exchange.

(c) By replacing the synthetic petroleum employed in section (a) by an equal quantity of synthetic petroleum, heavy grade (Nye Catalog No. 860–2), and following the same procedure there is obtained deuterated synthetic petroleum of 99 atom percent D overall.

(d) By replacing the palladium on carbon catalyst employed in section (a) by an equivalent quantity of 5% rhenium on carbon catalyst and then following the procedure described in section (a) there is obtained synthetic petroleum, light grade, of 99 atom percent D.

EXAMPLE 21

Exchange of super refined hydrocarbon (a) The same procedure as described under section (a) of Example 20 was followed for the exchange of 80 ml. of super refined hydrocarbon, low viscosity (Nye Catalog No. 820–1), except that the exchange temperature was 230° C. After 126 hrs. of exchange, 56 ml. of super refined hydrocarbon of 50 atom percent D was obtained. To this was added 51 ml. of unexchanged material and the exchange continued for a further 485 hrs. after which 82 ml. (63% yield) of super refined hydrocarbon, low viscosity, of 98.4 atom percent D was obtained.

(b) Exchange of super refined hydrocarbon, medium viscosity (Nye Catalog No. 820–2) by the procedure outlined in Example 21, section (a) gives deuterated super refined hydrocarbon, medium viscosity, of 99 atom percent D overall.

(c) The procedure of section (a) of Example 21 is repeated with the exception that platinum supported on carbon is substituted as catalyst. Following 7 days of exchange super refined hydrocarbon, low viscosity of 99 atom percent D is obtained.

(d) In similar manner, by replacing the catalyst employed in section (a) of Example 21 by an equivalent quantity of rhodium supported on carbon, super refined hydrocarbon, low viscosity of 98.7 atom percent D is obtained after 10 days of exchange.

The lubricating oils employed in Examples 20 and 21 were obtained from William F. Nye, Inc., New Bedford, Mass., U.S.A., and are described by the supplier as follows:

terated synthetic petroleum, heavy grade, Nye Catalog No. 860-2.

| Lubricating oil | Catalyst number | Viscosity, centistokes | | | | Pour point, °F. | Flash point, °F. | Density g./ml. (°F.) |
|---|---|---|---|---|---|---|---|---|
| | | 100° F. | 210° F. | ° F. | Cs. | | | |
| Synthetic petroleum: | | | | | | | | |
| Light | 860-1 | 31.6 | 5.7 | −65 | 55,000 | −75 | 455 | 0.83 (60) |
| Heavy | 860-2 | 437 | 39.5 | 0 | 37,000 | −35 | 520 | 0.85 (60) |
| SR hydrocarbon: | | | | | | | | |
| Low viscosity | 820-1 | 15.4 | 3.3 | −65 | 25,900 | −70 | 390 | 0.83 (100) |
| Medium viscosity | 820-2 | 78.1 | 8.2 | 0 | 10,300 | −30 | 445 | 0.87 (100) |

EXAMPLE 22

Exchange of lubricating oil

By replacing the synthetic petroleum used in section (a) of Example 20 by 100 g. of lubricating oil (Mobile Research Development Corp., Catalog No. RL-714, average molecular weight 515) there is obtained, after 400 hours of exchange, deuterated lubricating oil of 99 atom percent D overall.

We claim:

1. A petroleum fraction lubricating oil derived from petroleum consisting of deuterated saturated acyclic and cyclic hydrocarbons having at least 10 carbon atoms and containing at least 95% D with respect to the sum of H and D present in said lubricating oil.

2. A synthetic lubricating oil derived from petroleum gases consisting of deuterated saturated acyclic and cyclic hydrocarbons having at least 10 carbon atoms and containing at least 95% D with respect to the sum of H and D present in said lubricating oil.

3. A product as claimed in claim 2 which is a deuterated synthetic petroleum, light grade, Nye Catalog No. 860-1.

4. A product as claimed in claim 2 which is a deuterated synthetic petroleum, heavy grade, Nye Catalog No. 860-2.

5. A product as claimed in claim 1 which is a deuterated super refined hydrocarbon, low viscosity, Nye Catalog No. 820-1.

6. A product as claimed in claim 1 which is a deuterated super refined hydrocarbon, medium viscosity, Nye Catalog No. 820-2.

References Cited

UNITED STATES PATENTS 3,459,656   8/1972   Rausch _____ 208—18

FOREIGN PATENTS 41,827   12/1965   Germany _____ 208—15

OTHER REFERENCES

Huebner et al.—"Chemical Abstracts," vol. 68, 70902Y, 1968.

Dorogochinski et al.—Chemical Abstracts, vol. 55, 14334b.

Gordon et al.—Chemical Abstracts, vol. 61, 15615d.

HERBERT LEVINE, Primary Examiner

U.S. Cl. X.R.

208— 143; 252—41; 260—666 P, 667, 676, 683.9